United States Patent [19]

Evans

[11] 3,822,867
[45] July 9, 1974

[54] CONTROL APPARATUS AND METHODS FOR MOLDING MACHINERY

[75] Inventor: William B. Evans, Nashua, N.H.

[73] Assignee: Improved Machinery Inc., Nashua, N.H.

[22] Filed: Oct. 17, 1972

[21] Appl. No.: 298,238

[52] U.S. Cl........... 259/191, 259/DIG. 18, 264/329, 425/144, 425/243
[51] Int. Cl............................ B29f 3/08, B29b 3/00
[58] Field of Search........... 259/9, 10, 97, 191, 192, 259/193, DIG. 18; 425/144, 208, 243; 264/329

[56] References Cited
UNITED STATES PATENTS

| | | | |
|---|---|---|---|
| 2,350,539 | 6/1964 | Smith | 425/144 |
| 3,317,958 | 5/1967 | Stroup | 259/191 X |
| 3,642,402 | 2/1972 | Hutchinson | 425/144 |
| 3,698,844 | 10/1972 | Grimm | 425/144 |
| 3,733,059 | 5/1973 | Pettit | 259/191 |
| 3,762,692 | 10/1973 | Schippers | 259/191 |

Primary Examiner—Harvey C. Hornsby
Assistant Examiner—Alan Cantor
Attorney, Agent, or Firm—Robert R. Paquin

[57] ABSTRACT

Apparatus and methods wherein the directly sensed temperature of plasticized material discharged from a barrel is employed for controlling the temperature of the portion of the barrel adjacent to the discharge of the plasticized material therefrom and, alternatively, as during machine warm-up, the temperature of such barrel portion is controlled independently of said sensed temperature. Also, the temperature of a plurality of other portions of the barrel is controlled by a single control device; and back pressure on the screw during movement away from the barrel discharge and the screw driven rotation are controlled by a single control device.

23 Claims, 2 Drawing Figures

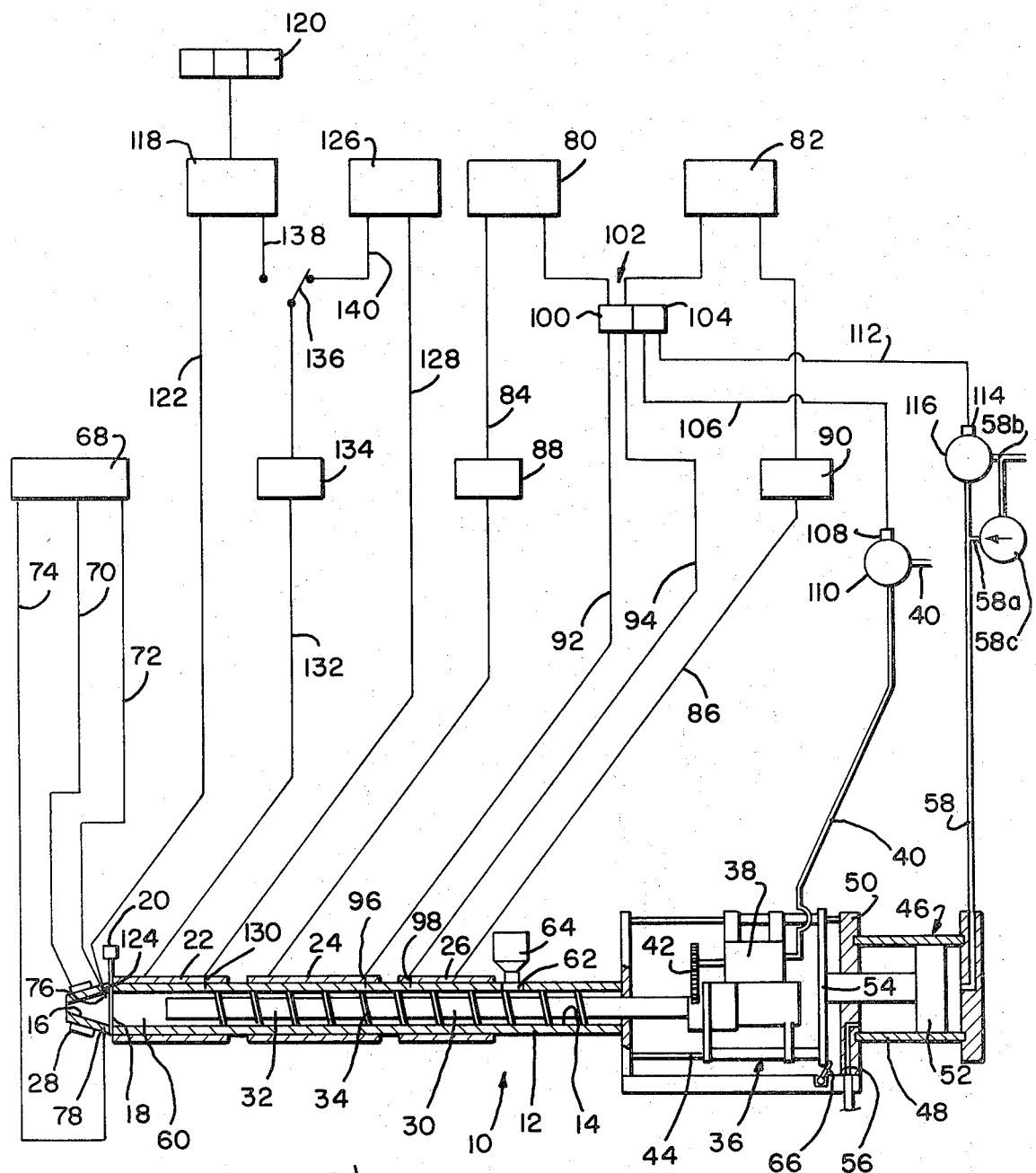
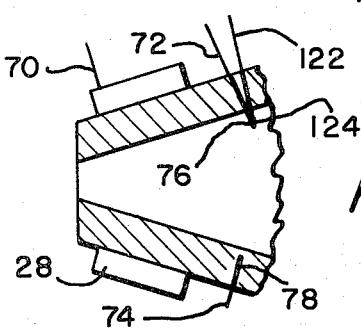
FIG. 1
FIG. 2

CONTROL APPARATUS AND METHODS FOR MOLDING MACHINERY

The present invention relates to apparatus and methods for the control of the melt temperature at which plasticized material is discharged from the barrel of plastic molding machinery.

In reciprocating screw injection molding machinery of the general type described in U.S. Pat. No. 2,734,226, the melt temperature at which plasticized material is discharged from the injection barrel is influenced by the speed of the screw driven rotation, the back pressure maintained on the screw during its movement rearwardly from the barrel discharge orifice, the barrel temperature profile and the screw design. Each of these important parameters must, therefore, be properly selected to enable optimum operating conditions to be attained. Conventionally, however, in such machinery the speed of the screw rotation, back pressure and barrel temperature profile, all must be individually selected and separately set into the machinery by the machine set-up man. It is believed that this necessity for the machine set-up man to individually select and set-in these parameters is undesirable and unecessarily introduces the risk that, due to human error, optimum operating conditions will not be attained.

Also, throughout the operation of both injection and extrusion molding machinery the melt temperature of the plasticized material discharged from the barrel must be maintained at its optimum level. It is believed that new and improved means and methods should be provided for insuring that the melt temperature is so maintained.

An object of the present invention is to provide injection molding machinery with new and improved means and methods particularly adapted whereby the beforedescribed parameters may be simply and readily set into the machinery with minimal risk of human error.

Another object of the invention is to provide new and improved means and methods particularly adapted for controlling the temperature at which plasticized material is discharged from the barrel of injection and extrusion molding machinery in accordance with the directly sensed melt temperature of such discharged plasticized material.

Another object is to provide new and improved means and methods particularly adapted whereby, although the temperature of the plasticized material may be controlled in accordance with the said directly sensed temperature, it may be alternatively controlled, such as during warm-up, independently of said sensed temperature.

Other objects and advantages of the invention will be apparent from the following description taken in connection with the accompanying drawings wherein, as will be understood, the preferred embodiment of the invention has been given only by way of illustration.

In accordance with the invention, molding machinery may comprise barrel means provided with discharge means for discharging plasticized material from the barrel means, screw means rotatably in the barrel means operable for causing plasticized material to be discharged from the barrel means through the discharge means, heater means for heating the interior of at least a portion of the barrel means, sensing means for directly sensing the temperature of plasticized material discharged through the discharge means, and control means responsive to the sensing means and controlling the heater means. Also, in accordance with the invention, injection molding machinery may be provided with a single control device for controlling a plurality of barrel heaters and a single control device for causing a predetermined pressure to be maintained on the screw means during its movement away from the discharge means and for also controling the driven rotation of the screw means, each such control device comprising dial means enabling such control by merely dialing-in a predetermined code.

In accordance with the invention, the temperature in a barrel of a molding machine which contains screw means driven for discharging plasticized material from said barrel, may be controlled by a method comprising the steps of directly sensing the temperature of plasticized material discharged from the barrel and controlling the temperature in at least a portion of the barrel in accordance with the directly sensed temperature. Furthermore, such method as applied to injection molding machinery may comprise the step of employing a single control device to control both driven rotation of the screw means and back pressure thereon, and employing a single control device to control the temperature in a plurality of portions of the barrel.

Referring to the drawings:

FIG. 1 schematically illustrates an injection screw provided with means constructed in accordance with one embodiment of the invention; and FIG. 2 is an enlarged fragmentary, schematic view showing the thermocouples directly exposed to plasticized material flowing through the nozzle of the apparatus illustrated in FIG. 1.

Referring more particularly to the drawings, 10 generally designates an injection unit adapted to supply plasticized material to a mold of a conventional injection molding machine. The injection unit 10 comprises an elongated injection barrel 12, the interior of which forms an axial cylindrical bore 14 communicating at its forward or left-hand end with discharge means adapted to discharge plasticized material from the barrel 12. The discharge means, as illustrated, comprises a nozzle 16 and a normally closed shut-off valve 18, located intermediate the barrel 12 and the nozzle 16, which is operated by a solenoid controlled, hydraulic cylinder-and-piston control 20 to selectively permit passage of plasticized material from the barrel 12 through the nozzle 16.

A heater unit 22 surrounds the end portion of the barrel 12 adjacent to the shut-off valve 18 for heating the interior of such barrel end portion; and a plurality of other heater units 24, 26 surround other portions of the barrel 12 intermediate such barrel end portion and the other barrel end for heating the interior of their surrounded barrel portions. Similarly, a heater unit 28 surrounds the nozzle 16 for heating the interior of the latter. The heater units 22, 24, 26, 28, as will be understood, may be of any suitable conventional construction.

A conventional injection screw 30, provided with the usual circumferential helical flights or thread 32 and lands 34, is axially located in the bore 14 for rotary and axial reciprocating movement therein. The screw 30 at its rearward or right-hand end projects from the bore 14 and is connected to a carriage, designated generally as 36, such that the screw 30 is axially movable conjointly with, and rotatable relative to, the carriage 36. The carriage 36 carries a conventional hydraulically operated rotary motor 38 powered by hydraulic fluid supplied from a source (not shown) through a supply conduit 40. The rotary motor is connected by suitable conventional gearing 42 to the screw 30 whereby the latter is rotatably driven by the rotary motor 38 during the operation of the motor 38.

The carriage 36 is slidably mounted on a plurality of tie rods 44 for axial movement towards-and-away from the barrel 12 and is axially driven towards the barrel 12 by a cylinder-and-piston motor designated generally as 46. As illustrated, the motor 46 comprises a stationary cylinder 48 affixed to a stationary support 50 and a piston 52 slidably in the cylinder 48 and connected to the carriage 36 by a cross head 54. The motor 46 is provided with a bleed conduit 56 which is connected to the forward or left-hand end of the cylinder 48 and a supply-and-discharge conduit 58 which is connected to the rearward or right-hand of the cylinder 48. The supply-and-discharge conduit 58 is connected to communicating conduits 58a, 58b to receive hydraulic fluid from a source (not shown) therethrough, the conduit 58a containing a check valve 58c preventing reverse flow of the hydraulic fluid from the cylinder 48 to the source through such conduit 58a. The supply-and-discharge conduit 58 is, moreover, connected to the conduit 58b through a regulating valve 116 whereby a controlled volume of fluid may be discharged from the cylinder 48 to the source independently of the conduit 58a through the conduits 58,58b and the valve 116.

The relative lengths of the barrel 12, the screw 30 and the cylinder 48, and the distance of axial travel of the carriage 36, are arranged such that, with the carriage 36 and the screw 30 at the illustrated extreme rearward or right-hand positions, a space or reservoir 60 is provided in the bore 14 intermediate the forward end of the screw 30 and the shut-off valve 18. The volume of this space or reservoir 60 is, with the screw 30 at its illustrated extreme rearward position, at least substantially that of the charge of plasticized material to be discharged through the nozzle 16 in a single operating cycle.

The barrel 12 is provided with a material inlet 62 adjacent its rearward or right-hand end and at a location whereby, with the screw 30 in its extreme forward position, a fully developed land 34 is provided by the screw thread beneath the inlet 62. The inlet 62 in the conventional manner communicates with a feed or supply hopper 64 whereby the material to be plasticized is supplied from the hopper 64 through the inlet 62 to the barrel contained bore 14.

The beforedescribed injection unit 10 is of conventional construction; and, hence, the operation thereof is believed to be apparent from the preceeding description. However, to facilitate understanding of the hereinafter given description of the illustrated control spparatus, a brief summary of the operation of the injection unit 10 follows.

In such operation, assuming the screw 30 to be at its extreme forward position in the barrel 12, hydraulic fluid is supplied to the rotary motor 38 to cause the motor 38 to rotatably drive the screw 30 through the gearing 42. Simultaneously, material to be plasticized is supplied from the hopper 64 through the inlet 62 to the bore 14, the rotation of the screw 30 serving to plasticize such material and to convey the material to the reservoir 60 forwardly of the screw 30 where, the shut-off valve 18 being closed, such material remains. After the volume of the plasticized material in the reservoir 60 becomes sufficiently great to fill the then existing volume of the reservoir 60, the plasticized material supplied to the latter commences to force the screw 30 to retreat rearwardly. During the retreating movement of the screw 30, hydraulic fluid in the cylinder 48 rearwardly of the piston 52 is discharged from the cylinder 48 through the conduits 58,58b at a rate controlled by the valve 116 whereby such fluid acts to yieldably restrain the rearward movement of the screw 30.

When the screw 30 rearwardly retreats a distance sufficiently great to trip a limit switch 66 thereby signaling that the desired shot or charge of plasticized material has been collected, the solenoid 20 is resultantly energized to open the shut-off valve valve 18. Also, hydraulic fluid is resultantly supplied to the rearward end of the cylinder 48 through the conduits 58b, 58a, 58 to cause the screw 30 to be forwardly driven to thereby drive the plasticized material in the reservoir 60 through the nozzle 16 to the communicating mold. Subsequently, the valve 18 again closes whereupon the injection unit 10 commences another operating cycle which proceeds in the beforedescribed manner.

Referring to the control apparatus for the injection unit 10, the nozzle heater unit 28 is controlled by control means comprising a differential pyrometer 68 to which it is electrically connected by an electrical lead 70. The pyrometer 68 is connected by electrical leads 72,74 to thermocouple or temperature sensing means 76,78, respectively. The thermocouple 76 is arranged to be directly exposed to plasticized material flowing through the nozzle 16 upstream of the heater unit 28 (that is, intermediate the valve 18 and the heater unit 28) for directly sensing the melt temperature of the plasticized material. The thermocouple 78 is arranged to sense the temperature of the nozzle 16 adjacent the thermocouple 76. As will be understood throughout the operation of the injection unit 10, the pyrometer 68 controls the heater unit 28 to maintain a zero temperature differential between the temperatures sensed by the thermocouples 76,78 and maintains the interior of the nozzle at a predetermined temperature.

The heater units 24,26 are controlled by separate control means or pyrometers 80,82, respectively, which, per se, may be of any suitable conventional construction. The pyrometers 80,82 are connected to the heater units 24,26 by individual electrical leads 84,86 containing relays 88,90, respectively, and act through the electrical leads 84,86 and relays 88,90 to control the heater units 24,26. The pyrometers 80,82, moreover, are both controlled by a single control device interposed in the electrical leads 92,94 which electrically connect the pyrometers 80,82, respectively, with the temperature sensing means or thermocouples 96,98 sensing the temperature at which the barrel 12 is heated by the heater units 24,26.

This single control device for the pyrometers 80,82, as illustrated, comprises the left-hand digit 100 of a two digit, digital switch, designated generally as 102. The digital switch 102, per se, is of conventional construction and may be, for example, Digitran series 9,000, type 9,004-2, a two digit, two poles per digit switch. The left-hand digit 100 of the switch 102, as will be understood, is electrically connected to the pyrometers 80,82 to vary the resistence thereof, and hence serves as a dial for permitting the resistance of the pyrometers 80,82 to be readily and simply varied by employment of a predetermined reference code wherein each numerical value of the digit 100 provides the pyrometers 80,82 with a predetermined resistance.

The right hand digit 104 of the switch 102 serves as a single control device for both causing a predetermined resistance to be maintained on the screw 30 during the rearward movement of the latter and also controlling the driven rotation of the screw 30 by the motor 38. More particularly, such right-hand digit 104 is electrically connected by a lead 106 to the electrical control 108 for a regulating valve 110 interposed in the conduit 40 whereby the flow of hydraulic fluid through such conduit 40 is controlled by the digit 104. The right-hand digit 104 is also electrically connected by an electrical lead 112 to an electrical control 114 for the regulating valve 116 whereby the flow of hydraulic fluid from the cylinder 48 through the valve 116 is controlled by the digit 104. Hence, the digit 104 serves as a dial for permitting both fluid flow through the conduit 40 and fluid discharge through the conduit 58, to be readily and simply varied by employment of a predetermined reference code wherein each numerical value of the digit 104 provides a predetermined combination of such flows.

The heater unit 22 is provided with first control means responsive to the melt temperature of the plasticized material discharged from the barrel 14 for controlling the heater unit 22, second control means operable for controlling the heater unit 22 independently of the temperature of the discharged plasticized material and means for causing such first and second control means to, alternatively, control the heater unit 22. More particularly, such first control means comprises a first pyrometer 118 provided with a digital control device 120 into which a predetermined melt temperature is preset, such digital control device 120 being, for example, Digitran series 9,000, type P093–0101 a three digit, one pole per digit switch. The pyrometer 118 is electrically connected by an electrical lead 122 to a melt temperature sensing means or thermocouple 124 which is located in the nozzle 16 intermediate the heater unit 28 and the shut-off valve 18 to be directly exposed to plasticized material passing through the nozzle 16. The thermocouple 124, as will be noted, is resultantly entirely separate and independent of the screw 30 yet directly exposed to the plasticized material for directly sensing the melt temperature thereof. The second control means for the heater unit 22 comprises a pyrometer 126 connected through an electrical lead 128 to a temperature sensing means or thermocouple 130 sensing the temperature of the barrel 12 at the location of the heater unit 22.

The heater unit 22 is controlled through an electrical lead 132, containing a relay 134, and a switch 136 which is actuable to alternatively connect the electrical lead 132 to electrical leads 138,140, in turn, connected to the pyrometers 118,126, respectively. Hence, during warm-up, the temperature of the heater unit 22 may be controlled by the pyrometer 126, while, throughout the normal machine operation, such heater unit 22 may be controlled by the pyrometer 118 in accordance with the directly sensed melt temperature of the plasticized material discharged from the barrel 12 through the nozzle 16.

From the preceeding description it will be seen that predetermined reference codes may be dialed into the control devices 100,104,120, to readily and simply establish settings predetermined to be capable of providing optimum operation of the injection unit 10. Hence, during set-up, the pyrometers 80,82 may be both properly set merely by dialing-in the control device 100 to the proper setting while the valves 108,116 may both properly set to provide optimum operation merely by dialing-in the proper code in the control device 104. Also, the desired melt temperature may be readily established by dialing-in the proper predetermined reference code in the control device 120. As a result, the important parameters of speed of screw driven rotation, back pressure maintained on the screw during its rearward movement, and barrel temperature profile, all can be readily and simply set-in without the risk of human error.

Moreover, as before mentioned, the heater unit 22 may be both controlled during warm-up by the pyrometer 126 and also, during normal operation, controlled responsive to the melt temperature of the discharged plasticized material by the pyrometer 118.

The operation of the before described control system is believed to be apparent from the preceeding description.

Moreover, from such description it will be seen that I have provided new and improved methods for controlling the temperature in the barrel 12 of a molding machine, which method may comprise the steps of directly sensing the temperature of plasticized material discharged from the barrel 12, and controlling the temperature in the portion of the barrel adjacent the discharge of the plasticized material in accordance with the directly sensed temperature. It will, moreover, be seen that such methods contemplate the control of the temperature in said barrel portion, alternatively, independently of the sensing, such as permits said independent control during warm-up while allowing control of the temperature in accordance with such sensing throughout normal operation. In addition, it will be understood that such methods further contemplate employment of a single control device for controlling the temperature in a plurality of other portions of the barrel 12 and, when the barrel 12 contains an injection screw 30 of the beforedescribed type, the employment of a single control device to control both the screw driven rotation and the resistance of the screw 30 during its rearward movement. It will in addition be seen that in such methods each of such single control devices may be readily preset by the employment of reference codes establishing settings of the controls predetermined as being capable of providing optimum performance while the predetermined, optimum melt temperature of discharged plasticized material may be simply preset by the employment of a reference code.

From the preceeding description it will be seen that the invention provides new and improved means and methods for accomplishing all of the beforestated objects and advantages. It will be understood, however, that, although only a single embodiment of the invention has been illustrated and hereinbefore described, the invention is not limited merely to the illustrated and described embodiment, but rather contemplates other embodiments and variations within the scope of the following claims.

Having thus described my invention, I claim:

1. Molding machinery comprising barrel means provided with discharge means for discharging plasticized material from said barrel means, screw means rotatably in said barrel means operable for causing plasticized material to be discharged from said barrel means through said discharge means, heater means for heating the interior of at least a portion of said barrel means, sensing means for sensing the temperature of plasticized material discharged through said discharge means, control means responsive to said sensing means for controlling said heater means, second control means operable for controlling said heater means, and switch means for causing said control means and said second control means to, alternatively, control said heater means.

2. Molding machinery according to claim 1, wherein said sensing means comprises means for directly sensing the temperature of the discharged plasticized material.

3. Molding machinery according to claim 1, wherein said sensing means is located in said discharge means to be directly exposed to plasticized material passing therethrough.

4. Molding machinery according to claim 1, wherein said heater means extends around the portion of said barrel means adjacent to said discharge means for heating such portion of said barrel means.

5. Molding machinery according to claim 1, further comprising a plurality of other heater means operatively associated with other portions of said barrel means for heating such other portions thereof, individual controlling means for said other heater means, and a single control device for controlling said controlling means.

6. Molding machinery according to claim 1, wherein said screw means comprises an injection screw axially movable in said barrel means, and further comprising means for rotatably driving said screw, means for axially driving said screw towards said discharge opening to cause said screw to discharge plasticized material through said barrel means, said screw axial driving means permitting said screw to be axially driven away from said discharge means by plasticized material while yieldably resisting such screw movement, and a single control device for causing a predetermined resistance to be maintained on said screw by said screw axial driving means during said screw movement away from said discharge means and for also controlling the driven rotation of said screw by said screw rotating means.

7. Molding machinery comprising barrel means provided with discharge means for discharging plasticized material from said barrel means, said discharge means comprising nozzle means, screw means rotatably in said barrel means operable for causing plasticized material to be discharged from said barrel means through said discharge means, heater means for heating the interior of at least a portion of said barrel means, said heater means being operatively associated with the portion of said barrel means adjacent to said discharge means for heating such portion of said barrel means, sensing means for directly sensing the temperature of plasticized material discharged through said discharge means, said sensing means being in said nozzle means to be directly exposed to plasticized material passing therethrough, control means responsive to said sensing means for controlling said heater means, second control means operable for controlling said heater means, and switch means for causing said control means and said second control means to, alternatively, control said heater means.

8. Molding machinery according to claim 7, wherein said screw means comprises an injection screw axially movable in said barrel means, and further comprising means operatively associated with said control means for presetting said control means with a predetermined temperature, a plurality of other heater means operatively associated with other portions of said barrel means for heating the interior of such other portions thereof, separate controlling means operatively associated with said other heater means for controlling said other heater means, a single control device operatively associated with said separate controlling means for controlling said separate controlling means, means for rotatably driving said screw, means for axially driving said screw towards said discharge opening to cause said screw to discharge plasticized material through said discharge means, said screw axial driving means permitting said screw to be axially driven away from said discharge means by plasticized material while yieldably resisting such screw movement, and a single control device for causing a predetermined resistance to be maintained on said screw by said screw axial driving means during said screw movement away from said discharge means and for also controlling the driven rotation of said screw by said screw rotating means.

9. Molding machinery according to claim 8, wherein each of said control devices comprises dial means adapted to be preset with a predetermined value.

10. Molding machinery comprising a barrel provided with discharge means for discharging plasticized material from one end of said barrel, a screw movably in said barrel for plasticizing material therein and causing the plasticized material to be discharged from said barrel through said discharge means, heater means operatively associated with said one end of said barrel for heating the interior of such end of said barrel, sensing means independent of said screw and located to be directly exposed to plasticized material discharged from said barrel through said discharge means for sensing the temperature of such plasticized material, first control means responsive to said sensing means for controlling said heater means, second control means operable for controlling said heater means independently of said sensing means, and means for causing said first and second control means to, alternatively, control said heater means.

11. Molding machinery according to claim 10, wherein said discharge means comprises a nozzle communicating with said one end of said barrel, and said sensing means is located in said nozzle to be directly exposed to plasticized material passing therethrough.

12. Molding machinery according to claim 10, wherein said screw is an injection screw axially movable in said barrel, and further comprising a plurality of other heater means operatively associated with other portions of said barrel for heating the interior of such other portions thereof, separate controlling means operatively associated with said other heater means for controlling said other heater means, a single control device operatively associated with said controlling means for controlling said controlling means, means for rotatably driving said screw, means for axially driving said screw towards said discharge opening to cause said screw to discharge plasticized material through said discharge means, said screw axial driving means permitting said screw to be axially driven away from said discharge means by plasticized material while resisting such screw movement, means for presetting said first control means with a predetermined temperature, and a single control device for causing a predetermined resistance to be maintained on said screw by said screw axial driving means during said screw movement away from said discharge means and for also controlling the driven rotation of said screw by said screw rotating means.

13. Molding machinery according to claim 12, wherein each of said control devices comprises dial means adapted to be preset with a predetermined value.

14. The method for controlling the temperature in a heated barrel of a molding machine which contains screw means driven for discharging plasticized material from said barrel, comprising the steps of sensing the temperature of plasticized material discharged from said barrel, controlling the temperature to which at least a portion of said barrel is heated in accordance with said sensed temperature, and alternatively controlling the temperature to which said portion of said barrel is heated independently of said sensing.

15. The method according to claim 14, wherein said temperature of said plasticized material is sensed during the discharge of the material from said barrel by sensing means directly exposed to the discharging plasticized material.

16. The method according to claim 14, wherein only the temperature to which the portion of said barrel adjacent to the discharge of the plasticized material is heated is so controlled.

17. The method according to claim 14, wherein the temperature to which said portion of said barrel is heated is controlled independently of said sensing during warm-up and in accordance with said sensing during normal operation.

18. The method according to claim 14, wherein a single control device is employed to control the temperatures in a plurality of other positions of said barrel.

19. The method according to claim 14, wherein said screw is an injection screw rotatably and axially driven in said barrel, said screw being movable away from said discharge means by plasticized material intermediate said screw and said discharge means while pressure is maintained on said screw yieldably resisting such movement, and further comprising the step of employing a single control device to control both the driven rotation of said screw and also said resistence on said screw.

20. The method for controlling the temperature in a heated injection barrel containing a rotatably driven, injection screw which is axially moved by plasticized material against yieldable resistance, comprising the steps of presetting by a single control both a predetermined yieldable resistance on the screw and also a predetermined rotation of the screw, presetting by a single control the temperatures at which a plurality of portions of said injection barrel are to be maintained, directly sensing the temperature of plasticized material discharged from the barrel, controlling the temperature to which the portion of the barrel adjacent to the discharge of the plasticized material is heated in accordance with said directly sensed temperature, and alternatively controlling the temperature to which said portion of said barrel is heated independently of said sensing.

21. The method according to claim 20, wherein said presetting of each of said controls is accomplished by the employment of reference codes establishing settings of the controls predetermined to be capable of providing the intended result.

22. The method according to claim 20, further comprising presetting a predetermined temperature of plasticized material discharged from the barrel.

23. The method according to claim 20, wherein the temperature to which said portion of said barrel to which is controlled independently of said sensing during warm-up and in accordance with said sensing during normal operation.

* * * * *